United States Patent [19]
Anderson et al.

[11] Patent Number: 5,129,023
[45] Date of Patent: Jul. 7, 1992

[54] OPTICAL FIBER CONNECTOR HAVING ENHANCED PROVISIONS FOR INTERCONNECTION AND FOR PREVENTION OF OPTICAL AND MECHANICAL DISCONNECTION

[75] Inventors: Jerry M. Anderson, Austell; Norman R. Lampert, Norcross, both of Ga.

[73] Assignee: AT&T Bell Laboratories, Murray Hill, N.J.

[21] Appl. No.: 700,018

[22] Filed: May 14, 1991

[51] Int. Cl.$^5$ .............................................. G02B 6/38
[52] U.S. Cl. ....................................... 385/70; 385/60; 385/72
[58] Field of Search .................. 350/96.2, 96.21, 96.22

[56] References Cited

U.S. PATENT DOCUMENTS

| | | | |
|---|---|---|---|
| 4,687,291 | 8/1987 | Stape et al. | 350/96.21 |
| 4,812,009 | 3/1989 | Carlisle et al. | 350/96.21 |
| 4,852,963 | 8/1989 | Lampert | 350/96.21 |
| 4,934,785 | 6/1990 | Mathis et al. | 350/96.21 |
| 4,984,867 | 1/1991 | Giovanna | 350/96.21 |

OTHER PUBLICATIONS

3M Company brochure, May 15, 1991; John Huber.

Primary Examiner—Frank Gonzalez
Assistant Examiner—John Ngo
Attorney, Agent, or Firm—Edward W. Somers

[57] ABSTRACT

An optical fiber connector (22) which is assembled to a coupling housing (90) by causing only relative linear motion between the connector and the housing and which also includes facilities for preventing optical disconnection from another connector having a portion disposed in the housing includes a cap (45) having two diametrically opposed slots (53—53) each having an enlarged portion (57). A barrel (42) is retained within the cap and has mounted thereto a ferrule (40) in which is terminated an end portion of an optical fiber (21) which is to be connected to another optical fiber. The connector is moved to cause the ferrule to enter a sleeve (92) of a housing of a coupling (35) and to cause locking pins (96—96) of the housing to enter and to be moved along the slots of the cap until each pin is received in an enlarged portion of a slot. A cap extender (60) is connected to an end of the cap and includes an annular detent (63). A shell (27) which is disposed about and is slidably movable on the cap is moved to cause the annular detent projecting radially from the cap extender to become locked to latching means (89) formed on an inner wall of the shell to lock the shell to the cap and prevent mechanical disconnection of the connector from the coupling mounted in a panel (37). An annular shoulder (70) on the cap extender limits the travel of the ferrule (40) to prevent optical decoupling from another ferrule (40') in the coupling housing when tensile forces are applied to a cable (30) the optical fiber of which is terminated by the ferrule.

20 Claims, 8 Drawing Sheets

OPTICAL FIBER CONNECTOR HAVING ENHANCED PROVISIONS FOR INTERCONNECTION AND FOR PREVENTION OF OPTICAL AND MECHANICAL DISCONNECTION

TECHNICAL FIELD

This invention relates to an optical fiber connector which has enhanced provisions for interconnection and for the prevention of optical and mechanical disconnection. More particularly, this invention relates to a ferrule optical fiber connector which is secured to a coupling housing by movement in a direction parallel to a longitudinal axis of the housing and which includes provisions to prevent optical and mechanical decoupling.

BACKGROUND OF THE INVENTION

Connectors for optical fiber transmission systems are known in the art. Often times it becomes necessary to arrange a plurality of optical fiber connectors in a panel to facilitate multifiber connections. A very much used ferrule connector for terminating and connecting two optical fibers is one which is referred to as an ST ® connector, ST being a registered trademark of AT&T. The ST connector is disclosed, for example, in U.S. Pat. No. 4,934,785 which issued on Jun. 19, 1990 in the names of T. D. Mathis and Calvin M. Miller.

An ST connector includes a cylindrical plug or ferrule, as it is often called, having a passageway therethrough for receiving an end portion of an optical fiber to be terminated. The ferrule which is received in a barrel that is mounted in a cap is spring-loaded. When two of the ferrules are received end-to-end in a coupling sleeve, for example, one or both of the ferrules is moved along its longitudinal axis during the connection process.

During the connection process, a key which extends radially from the barrel in which an end portion of the ferrule is received is aligned and moved along a keyway in a housing of a coupling as the ferrule is moved into a sleeve disposed within the housing. At the same time, two locking pins which extend radially from the coupling housing are moved into and along camming slots which extend helically from a front end of the cap rearwardly. As the locking pins are moved along the camming slots, the ferrule is moved farther into the sleeve. When each locking pin reaches an end of its associated camming slot, a craftsperson applies forces to the cap to cause it to move rotatably to cause each locking pin to be aligned with a relatively short locking slot which extends from an inner end of the associated camming slot toward a free end of the cap. This pushing motion followed by a rotary motion is often called a bayonet turn. Also, when each locking pin reaches an innermost end of the associated camming slot, the ferrule is at its farthest point within the sleeve from an entrance thereof.

Of course, forces applied to a mating second connector to cause its ferrule to be moved into and along the sleeve to its innermost position must be sufficient to overcome spring forces which tend to cause the ferrule of the other first connector to be biased into the sleeve. In fact, when only a first one of the ferrules is disposed within the sleeve, its innermost end extends beyond the transverse centerline of the sleeve. The transverse centerline of the sleeve is referred to as the optical connection plane. This extension past the optical connection plane is referred to as overtravel. As a result, forces must be applied to the second ferrule to overcome the spring forces of the first ferrule to cause it to moved slightly to allow the second ferrule to be moved past the optical connection plane to that position which corresponds to locking pins reaching the innermost ends of the camming slots of the second connector. After the locking pins are aligned with the relatively short locking slots, the craftsperson allows the spring associated with the second ferrule to force the cap rearwardly to cause the relatively short locking slots to be moved along the locking pins to secure the second connector to the coupling housing and to cause the end of the second ferrule to return to the optical connection plane.

Stringent tolerances are needed in order to ensure that the over-travel and return of the ferrule to the optical connection plane are controlled to achieve a proper connection. It is most desirable that the connection be made without the need to bayonet turn or to turn threadably the connector cap as must be done with some presently manufactured ferrule connectors.

Another problem with the use of prior art ferrule connectors relates to the potential for optical disconnection of optical fiber end faces or of an optical fiber end face and an optical device to which it is connected. It will be recalled that the connector ferrule is biased outwardly of the cap by a compression spring. Should sufficient force be applied inadvertently axially to the optical fiber cable which is terminated by the ferrule in a direction away from the optical connection, the ferrule will be moved in a direction outwardly from the center of the sleeve, causing effectively a significant optical loss and/or disconnection of the optical fiber end faces or of a fiber end face and a device and hence a significant optical loss and/or disconnection of optical transmission.

Also, because of the construction of the housing, the ferrule, upon the application of forces to the cable in a direction transversely of the axis of the connector will result in a turning of the ferrule about a fulcrum located between the center of the sleeve and the end of the cap. This results in a canting of the end face of the ferrule and angular spacing thereof from the other ferrule or device thereby causing an optical disconnection or increased transmission loss.

In another prior art ferrule connector, a non-optical disconnect feature is built into the connector plug arrangement. See U.S. Pat. No. 4,812,009 which issued on Mar. 14, 1989 in the names of A. W. Carlisle, B. V. Darden and C. J. Myers. A cap extender extends longitudinally along the optical fiber cable and includes an externally threaded end which is turned into engagement with an internally threaded cable entrance end of the cap. The portion of the barrel which extends into the cap extender is provided with an annulus which when the cap extender is threaded completely into the cap engages an inner portion of the cap extender, restraining the barrel and the ferrule from movement. Further, the cap extender is used to transfer transverse forces which are applied to the cable from the optical connection and instead transfers them to the connector cap. A conically shaped strain relief portion is disposed about and extends beyond the cap extender into engagement with the jacket of the cable.

One of the problems with this last-described arrangement is that when the cap extender is threaded completely into the cap prior to installation onto the coupling housing, it is impossible to obtain the overtravel needed for each locking pin to travel the complete length of an associated camming slot and be received in a relatively short locking slot. On the other hand, if the non-optical disconnect cap extender is not turned completely into the cap, it becomes somewhat awkward to couple the connector assembly to the coupling housing, as the cap must be grasped by a user to bayonet turn the connector. Holding the cap extender subassembly will cause slipping relative to the cap as forces are applied to the coupling. Furthermore, only one connector having a non-optical disconnect feature may be assembled to a coupling housing in the field. Otherwise, with the cap extenders of both connectors turned threadably completely into associated caps, the last one to be assembled to the housing would cause compressive damage to fiber end faces in the abutting ferrules.

As should be apparent, some prior art connectors exhibit problems that need to be overcome. In one prior art arrangement, forces applied to one cable in excess of approximately two pounds will cause ferrules to decouple or disconnect at the fiber end faces within a coupling housing. The described arrangement having the non-optical disconnect feature overcomes the problem of optical disconnect by limiting ferrule travel away from the optical connection plane; however, it has several limitations. First, the connector assembly cannot be held by the cap extender and strain relief sub-assembly while pushing and rotating onto the coupling when the cap extender is loosely threaded onto the cap. The cap extender will be turned but the cap will not become locked to the coupling. Secondly, if the cap extender is turned in completely into the cap, the locking pins of the coupling housing cannot travel the complete length of the camming slots, preventing installation of the connector.

What is needed and what seemingly is not available is a more effective arrangement to prevent optical as well as mechanical disconnection in a ferrule connector arrangement. Also, the sought after connector should be one which is assembled and secured to a coupling housing with linear motion only. What is sought after and what seemingly is not available is an ST connector which is secured to a coupling housing, with the housing mounted in a panel by a pushing motion without the need to turn the connector relative to the housing, and yet is one which prevents decoupling of the ferrule and housing.

SUMMARY OF THE INVENTION

The foregoing problems of the prior art have been solved with the optical fiber connector of this invention. An optical fiber connector comprises a cap which includes a longitudinally extending slot having an enlarged portion spaced inwardly from an entrance thereto and a cap extended which is connected to a fiber entry end of the cap. A barrel is mounted in the cap and biased outwardly therefrom. A ferrule is mounted in the barrel and includes a passageway for receiving an end portion of an optical fiber, the ferrule adapted to become disposed in a sleeve of a coupling housing to abut another ferrule at an optical connection plane within the sleeve.

The cap is capable of being secured to the coupling housing by causing relative linear motion between the ferrule and the sleeve to cause the ferrule to become disposed in the sleeve and to cause a locking pin of the housing to enter the slot of the cap and become disposed in the enlarged portion thereof. The biasing of the barrel and hence of the ferrule is such that when the other ferrule is disengaged therefrom, the ferrule is capable of being moved past the optical connection plane a first distance. The cap extender includes means for limiting movement of the ferrule from the optical connection plane a second distance, which is less than the first distance. Also included is means which cooperates with the cap to prevent withdrawal of the locking pin from the cap and unintended mechanical decoupling of the cap from the coupling housing.

More particularly, an optical fiber connector includes a cap which includes a flanged end and two tapered slots extending longitudinally from the flanged end toward an opposite end of the cap. Each slot has an enlarged portion disposed between the flanged end and an inner end of the slot adapted to receive a locking pin of a coupling housing. The cap includes an annular lip disposed adjacent the opposite end and projecting inwardly. A barrel extends through an opening defined by the annularly projecting lip and includes an enlarged end adjacent to the flanged end of the cap. The barrel includes a cavity opening to the enlarged end thereof. A ferrule which has a passageway therethrough for receiving an end portion of an optical fiber has an end portion disposed in the cavity of the barrel. The ferrule is adapted to become disposed in a sleeve of a coupling housing to abut another ferrule which terminates another optical fiber at a connection plane within the sleeve. A compression spring is disposed about the barrel between one side of the annular lip of the cap and the enlarged portion of the barrel and causes the barrel and the ferrule to be biased in a direction outwardly from the cap. The biasing of the ferrule is such that when the other ferrule is disengaged therefrom within the sleeve, the ferrule is capable of being moved past the optical connection plane a first distance. Retention facilities are disposed about the barrel on an opposite side of the annular lip to hold the barrel within the cap as forces of the compression spring tend to push the barrel outwardly from the cap. A cap extender having an optical fiber entry end and an opposite end is fastened to the opposite end of the cap to hold the cap secured to the cable, the cap extender including detent means adjacent to the opposite end of the cap. The cap extender includes abutment means effective when the cap is secured to a housing for limiting movement of the barrel and the ferrule in a direction from the opposite end of the cap extender to the fiber entry end thereof to a second distance, which is less than the first distance.

The connector also includes a shell disposed concentrically about and movable slidably with respect to the cap extender, the shell having an annularly inwardly projecting collar disposed adjacent one end thereof and a latch formed between the collar and an opposite end thereof. The shell is movable from an unlocked position whereat the detent means is caused to snap-lock to the latch and the collar becomes disposed adjacent to the flanged end of the cap hold the connector such that the ferrule is disposed within the coupling housing and each locking pin of the coupling retained within the enlarged portion of a slot in the cap. This arrangement effectively prevents mechanical as well as optical decoupling of the connection.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
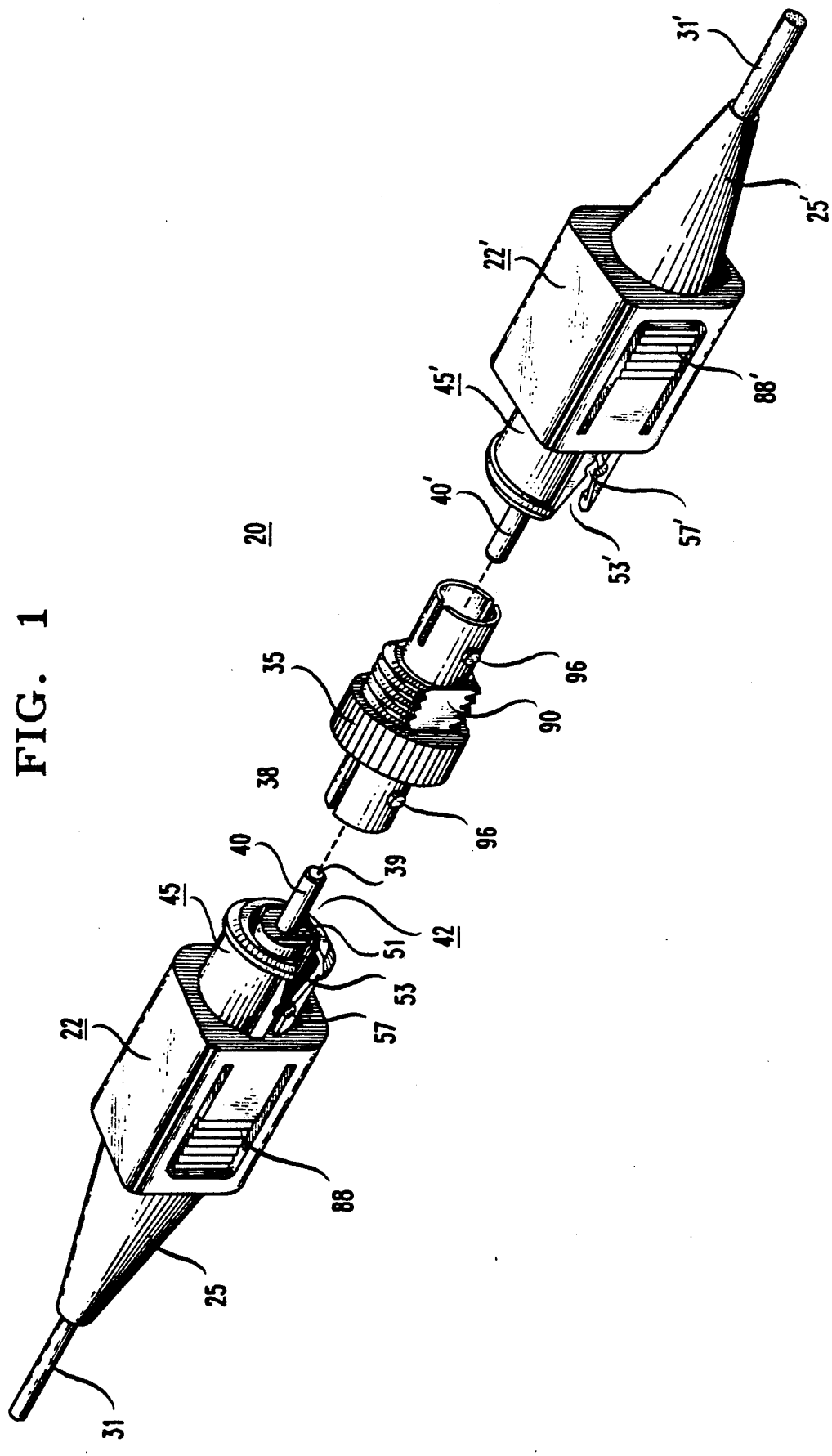
FIG. 1 is a perspective view of an optical fiber connection arrangement which includes optical fiber connectors of this invention.
Figure 2:
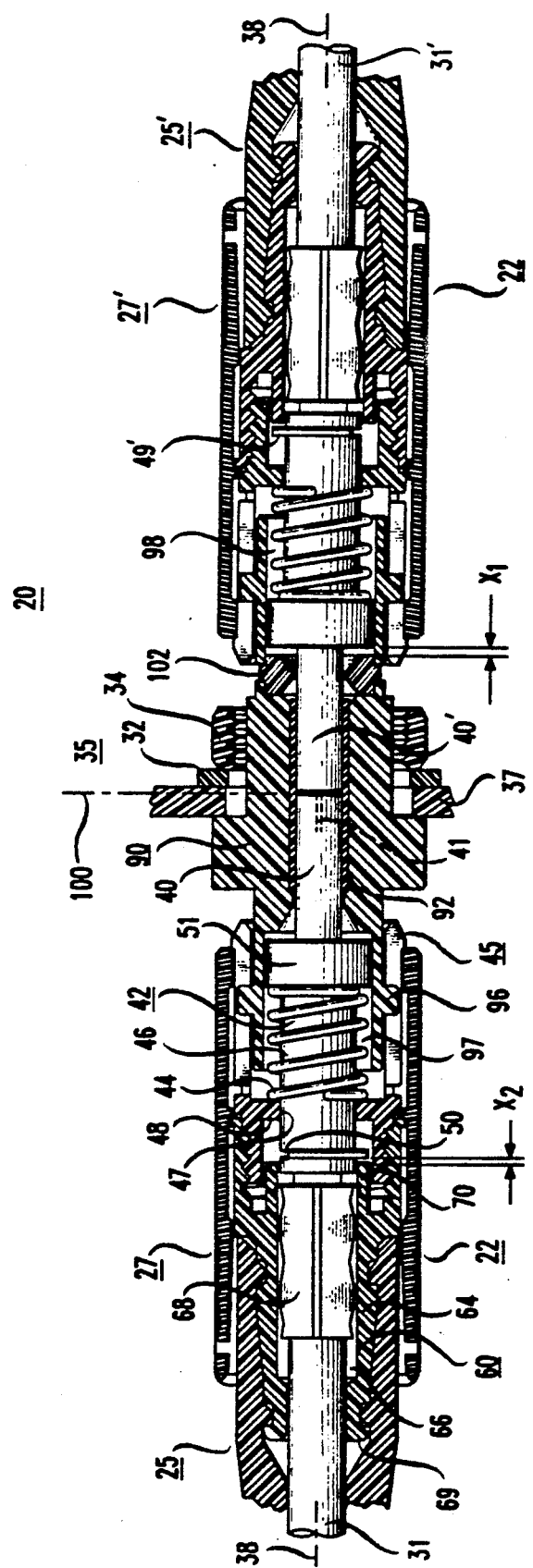
FIG. 2 is a side elevational view of the optical fiber connection arrangement of FIG. 1.
Figure 3:
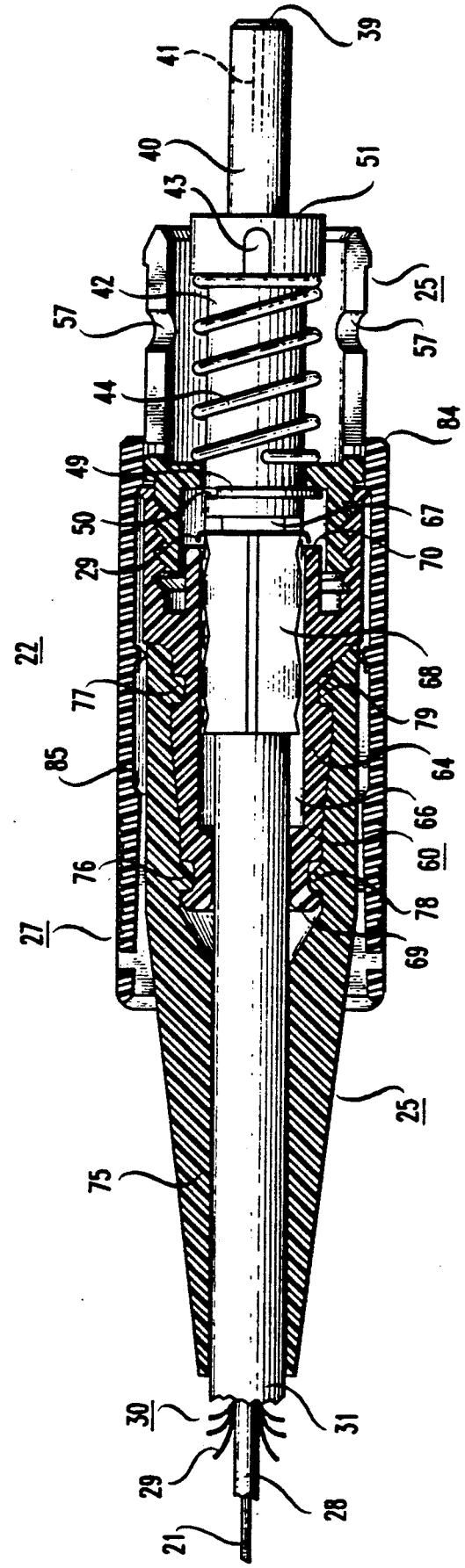
FIG. 3 is a side elevational view of a connector of FIG. 1.

Referring now to FIGS. 1 and 2 there are shown perspective and side elevational views of a connector system designated generally by the numeral 20 which accommodates ferrule connectors that terminate optical fibers. A ferrule connector or plug assembly is depicted in FIGS. 1, 2 and 3 and is designated generally by the numeral 22. Each connector 22 includes a connector subassembly 25 and a shell 27.

Each of two optical fibers 21—21 (see FIG. 3) to be connected includes a glass core and cladding, and a coating system, which is well known in the art. The optical fiber may be enclosed in a tube 28 of polyvinyl chloride (PVC) to provide what is referred to as a buffered fiber which may be terminated and connected in accordance with this invention. The connective arrangement of this invention also may be used to connect single fiber cables 30—30 (see again FIG. 1) in which covering the tube 28 is a strength member 29 such as one made of aramid fibrous material, for example, and an outer jacket 31 which may be comprised of PVC.

Referring to FIGS. 1 and 2, it can be seen that the connector system 20 comprises two of the plug assemblies 22—22 which are connected through a coupling 35. Corresponding elements of the plug assemblies 22—22 are identified with the same numerals with those on the right as viewed in FIG. 2 being provided with a superscript prime. The plug assembly 22 is such that longitudinal axes 38—38 of the assemblies are coaxial. It should be noted that in FIG. 2, plug assemblies 22—22 are shown assembled to a coupling 35 mounted in a panel 37 with a lock washer 32 and a nut 34. In addition to an end portion of an optical fiber 21, each plug subassembly 25 comprises an optical fiber ferrule or plug 40, having a passageway 41 (see FIGS. 2 and 3) and being made of a glass, plastic or ceramic material, for example. The plug 40 has an outer diameter of about 2.5 mm. An end face 39 of the plug 40 includes an opening of the passageway 41.

In terminating a cable 30, the optical fiber coating system, as well as the tube 28, the strength member 29 and the outer jacket 31, is removed from an end portion of an optical fiber 21 prior to its termination with a plug 40. Then the uncoated end portion of the optical fiber is inserted into the passageway 41 of a plug 40. The uncoated end portion of the optical fiber 21 is secured within the passageway 41 of the plug 40 and the end face of the optical fiber is cleaved and polished, for example. This process is repeated with another optical fiber and plug assembly.

Each connector subassembly 25 also includes a connector body or barrel 42 (see FIGS. 1 and 2) made of a plastic or metallic material, a compression spring 44 and a tubular cap 45 (see also FIGS. 4 and 5) made of a plastic material. It should be observed that the plug 40, the barrel 42 and the cap 45 each has a cylindrical cross-section. The barrel 42 includes a separate orienting or alignment key 43 (see FIG. 6) which projects radially from the longitudinal axis 38. Also, an outer surface of the barrel is provided with a longitudinally extending slot 33.

The barrel 42 includes an intermediate diameter portion 46 (see FIGS. 2 and 6) which extends through an opening 47 in an internally disposed annular lip 48 in the cap 45. A retaining washer 49 is disposed in a groove 50 (see FIGS. 3 and 6) and circumscribes the intermediate diameter portion on the outer side of the annular lip 48. The spring 44 is disposed about the intermediate diameter portion 46 of the barrel 42 between the annular lip 48 and a large diameter portion 51. As a result of this arrangement, the spring 44 biases the barrel 42 outwardly from the cable to hold the barrel within the cap 45.

Figure 4:
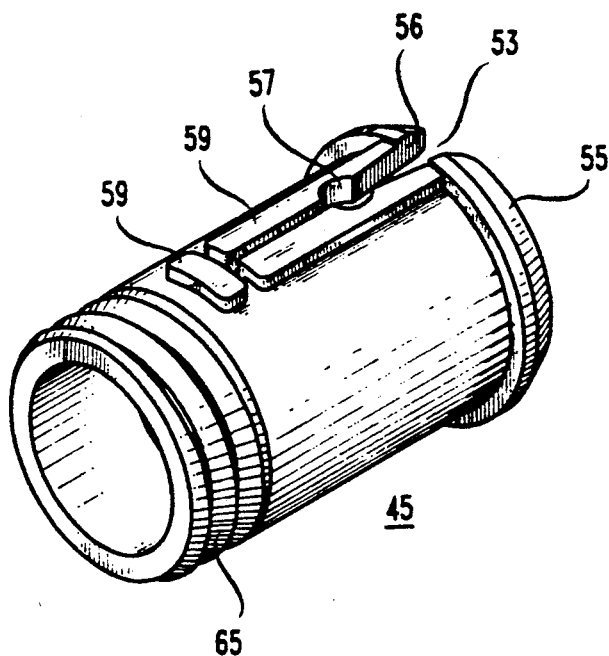
FIG. 4 is a perspective view of a cap of the connector of FIG. 3.
Figure 5:
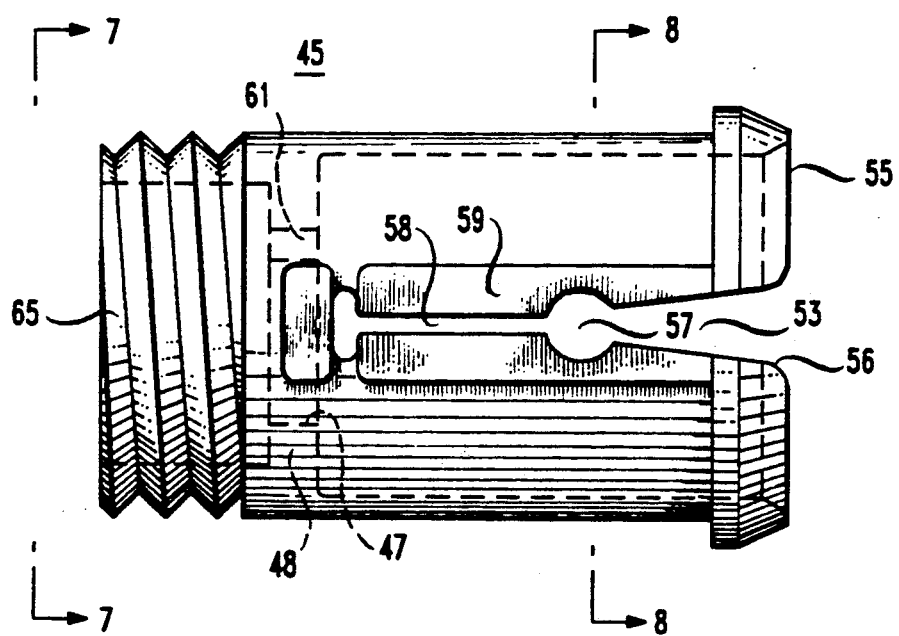
FIG. 5 is a plan view of the cap of FIG. 4.
Figure 6:
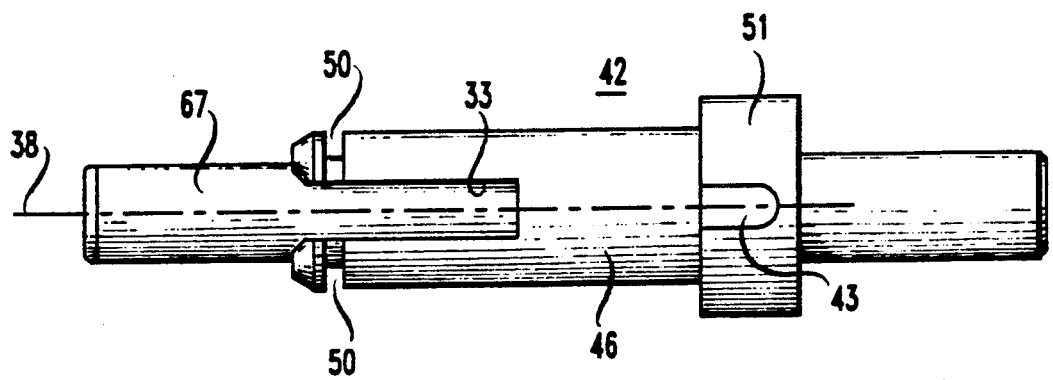
FIG. 6 is a plan view of a barrel of the connector of FIG. 3.

As can be seen in FIGS. 4 and 5, the cap 45 includes two diametrically opposed longitudinally extending slots 53—53 (see also FIGS. 7 and 8) each of which extends from a flanged beveled end 55 of the cap. Also, the slot 53 is formed to include a tapered portion 56 which opens to an enlarged generally circular portion 57. The remaining portion of the slot 53 is considerably more narrow than the narrowest portion of the tapered portion 56 and terminates at an inner end 58. With this structure, the walled portions of the cap can be flexed to permit entry of a portion of the coupling 35 into the tapered portion of the slot 53 to allow it to become disposed in the enlarged portion 57.

Also, portions of a wall of the cap adjacent to each of the slots 53—53 are increased in thickness to provide a guide rail 59. The guide rail 59 is adapted to mate with portions of the shell 27 (see FIGS. 9-12). Each guide rail 59 is adapted to become received in an internally facing groove 52 (see FIG. 11) of the shell 27 to prevent rotation of the cap relative to the shell. As a dual function, the guide rail 59 reinforces the walls which define the associated slot 53.

Figure 7:
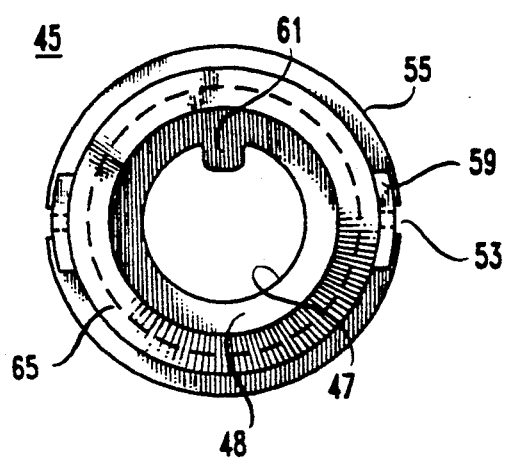
FIG. 7 is an end view of the cap of FIG. 5 taken along lines 7—7 thereof.
Figure 8:
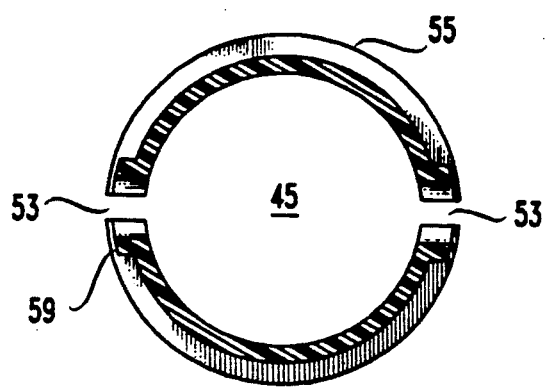
FIG. 8 is an end section view of the cap of FIG. 5 taken along lines 8—8 thereof.

The cap 45 also includes a guide pin 61 (see FIG. 7). The guide pin 61 is adapted to be received in the longitudinally extending slot 33 (see FIG. 6) in the barrel to guide movement of the barrel relative to the cap 45 and to maintain one orientation of the key 43 relative to the slots 53—53 in the cap.

Further, as can be seen in FIGS. 4 and 5, an end 65 of the cap which is opposite to the flanged end 55 is threaded externally. The threaded portion facilitates securement of the cap to other portions of the connector and provides limits of travel for the shell 27.

Figure 13:
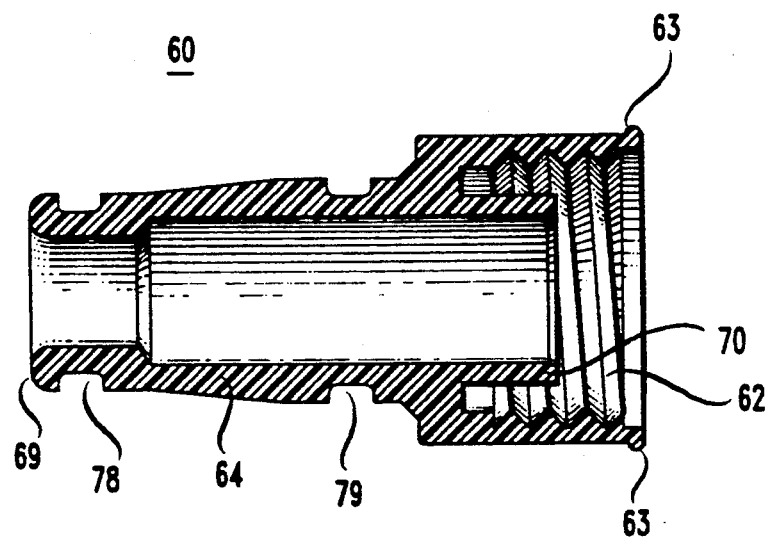
FIG. 13 is a side elevational view of a cap extender which includes provisions for limiting movement of the barrel and for facilitating the securement of the shell to the cap extender and the cap.

Facilities also are provided to transfer any lateral forces which are applied to the cable to the cap 45 instead of allowing them to affect adversely the optical connection. This is accomplished with a cap extender which is designated generally by the numeral 60 (see FIGS. 2, 3 and 13). As is seen in FIGS. 2, 3 and 13, the cap extender 60 includes an internally threaded end 62 which is adapted to be secured to the externally threaded end of the cap 45. Projecting radially from a free end of the extender cap 60 is an annular detent 63. Connected to the internally threaded end 62 is a smaller diameter portion 64 which is spaced a sufficient distance from the outer surface of the cable jacket 31 to provide an annular space 66 (see FIGS. 2-3) to allow the strength member yarn 29 to be arranged in a retroflexed configuration over the cable jacket and secured between a rear tubular portion 67 of the barrel 42 (see FIG. 6) and a crimped tubular member 68. Connected to the small diameter portion 64 is an end portion 69 which has an inner diameter which is such that the end portion 69 fits snugly over the cable jacket.

The cap extender 60 includes provisions for limiting the distance by which the retainer washer 49 is allowed to move from the annular lip 48. This arrangement effectively limits rearward travel of the ferrule 40 which may be caused by inadvertent forces being applied to the cable 30. As a result, optical disconnection of fibers which are terminated by two ferrules is prevented. Optical disconnection is prevented by causing the cap extender to be provided with an annular shoulder 70. The shoulder 70 is disposed concentrically within, but spaced from, the externally threaded portion 62 of the cap extender 45. The diameter of the shoulder 70 is such that it engages the retaining washer 49 upon movement of the retaining washer to the left as viewed in FIG. 2.

Completing the plug subassembly 25, there is shown a cable support portion 75 (see FIG. 3) which may extend from the cap extender 60 along the optical fiber cable 30 in a conically shaped configuration. This portion of the plug assembly 22 provides cable strain relief and ensures that the cable can withstand repeated bends in use after interconnection with another cable without undue stresses being imparted to the optical fibers. As is seen, the cable support portion includes two inwardly projecting ribs 76 and 77 which are received in grooves 78 and 79 of the cap extender 60.

Figure 9:
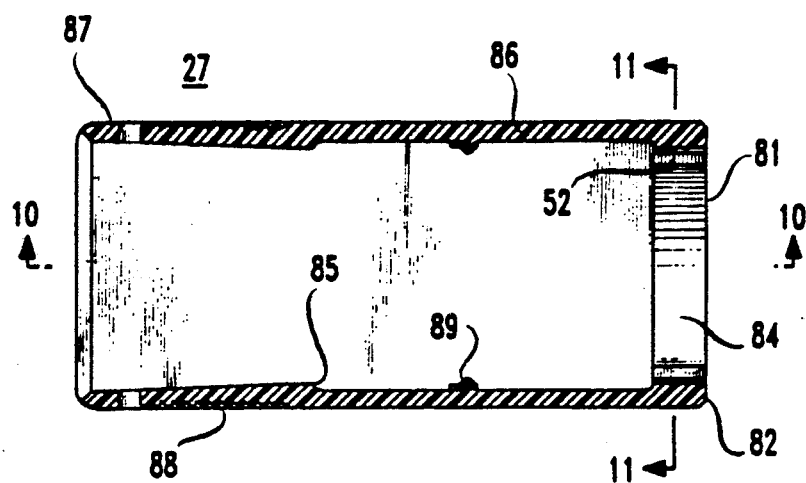
FIG. 9 is an elevational view in section of a shell of the connector of FIG. 3.
Figure 10:
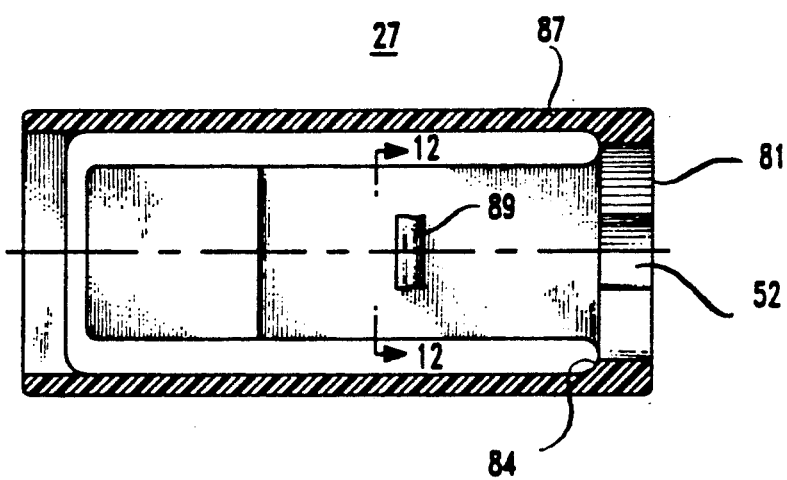
FIG. 10 is a plan view in section of the shell of FIG. 9 taken along lines 10—10 thereof.
Figure 11:
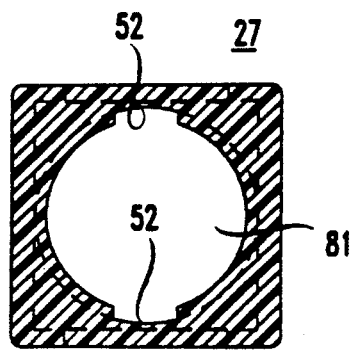
FIG. 11 is an end sectional view of the shell of FIG. 9 taken along lines 11—11 thereof.
Figure 12:
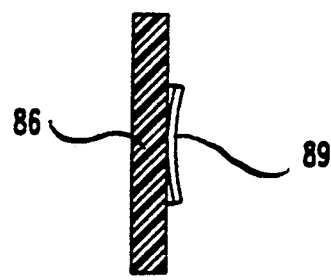
FIG. 12 is a detail view of a latch of the shell of FIG. 10.

The connector assembly 22 also includes the shell 27 (see FIGS. 2-3 and 9-12) and which is disposed about the cap 45, the cap extender 60 and the cable support portion 75. As is seen in FIG. 11, the shell 27 has a cross section transverse to the longitudinal axis of the connector which is square. Further, the shell 27 is formed to provide a chamber 81 which in cross section is substantially circular for receiving a connector subassembly comprising the cap extender, cap, barrel and ferrule. As is seen in FIG. 2-3 and 9, the shell 27 includes an end 82 which includes an inwardly projecting collar 84 and lateral shell portions 86—86 which may be flexed. A fulcrum 85 is associated with each portion 86. The shell portion 86 includes an externally knurled end portion 88. Also, the shell portion 86 is provided with an inwardly facing latch 89 (see also FIG. 12) at each side.

In the assembly of the connector, a shell 27 is caused to become disposed over a cap 45. Then a cap extender 60 is inserted into an opposite end of the shell and turned threadably onto the cap. Of course, a barrel 42, ferrule 40, a compression spring 44 and a retaining washer 49 are caused to become assembled to the cap.

In use, a connector assembly as is shown in FIG. 3 with the shell 27 being disposed in an unlocked position is moved toward a housing 90 (see FIGS. 1 and 14) of a coupling 35 which is mounted in the panel 37 to cause the ferrule 40 to enter a sleeve 92 which is mounted within the housing. The movement is made after the key 43 of the barrel 42 is aligned with a keyway 94 (see FIGS. 1 and 2) in the housing 90. With this alignment, pins 96—96 which project radially from the coupling housing are caused to enter the tapered slots 53—53 of the cap 45, the tapered slots 53—53 each being disposed at 90° to the key 43. Inasmuch as the diameter of each locking pin 96 is greater than the width of an inner portion of the slot 53, such movement causes the walls of the cap to be moved apart. Further movement of the connector assembly 22 causes each pin 96 of the coupling housing to become received in an enlarged opening 57 of the slot 53 (see FIG. 14) in which it is being moved to secure the cap to the coupling housing. As is noted, this assembly of the connector assembly 22 to the coupling housing 90 is accomplished with linear movement only of the assembly relative to the coupling housing.

When the connector assembly 22 is secured to a coupling housing, a free end of the ferrule 40 may abut a free end of another ferrule, a ferrule 40', which already is in the sleeve (see FIG. 2). In this case, spring forces cause the left-hand ferrule 40 as viewed in FIG. 2 to urge the other ferrule 40' to the right as viewed in FIG. 2, to a point of equilibrium of the two spring forces whereupon the free ends of the two ferrules are disposed in an optical connection plane 100. Should the other ferrule not yet be disposed in the sleeve, the end face 39 of the ferrule under the urging of its spring will become disposed to the right of the optical connection plane 100 with the barrel 42 engaging the coupling housing (see FIG. 14).

When two ferrules 40—40 are abutted in the coupling sleeve 92 (see FIG. 2), each ferrule upon withdrawal of the other is capable of projecting outwardly from its associated cap a first distance $X_1$ until the enlarged portion 51 of the barrel 42 engages the coupling 35. For example, any rearward movement of the ferrule 40 out of the sleeve such as by tensile forces applied to the cable must be limited to a distance less than the first distance $X_1$ to prevent optical disconnection. This is accomplished by limiting the distance between the retaining washer 49 and the cap extender shoulder 70 when the ferrule is disposed in the sleeve with its free end at the optical connection plane 100 to be a second distance $X_2$ (see FIG. 2) which is less than the first distance $X_1$. It is to be noted that the length of each of cavities 97 and 98 (see FIG. 2) in ends of the coupling housing 90 is substantially the same when the housing is fitted with a sleeve retainer 102.

Linear alignment of the barrel 42 and the ferrule 40 is maintained relative to the cap by the inwardly projecting guide pin 61 of the cap that is received in and that travels along the longitudinally extending slot 33 in the barrel.

Figure 14:
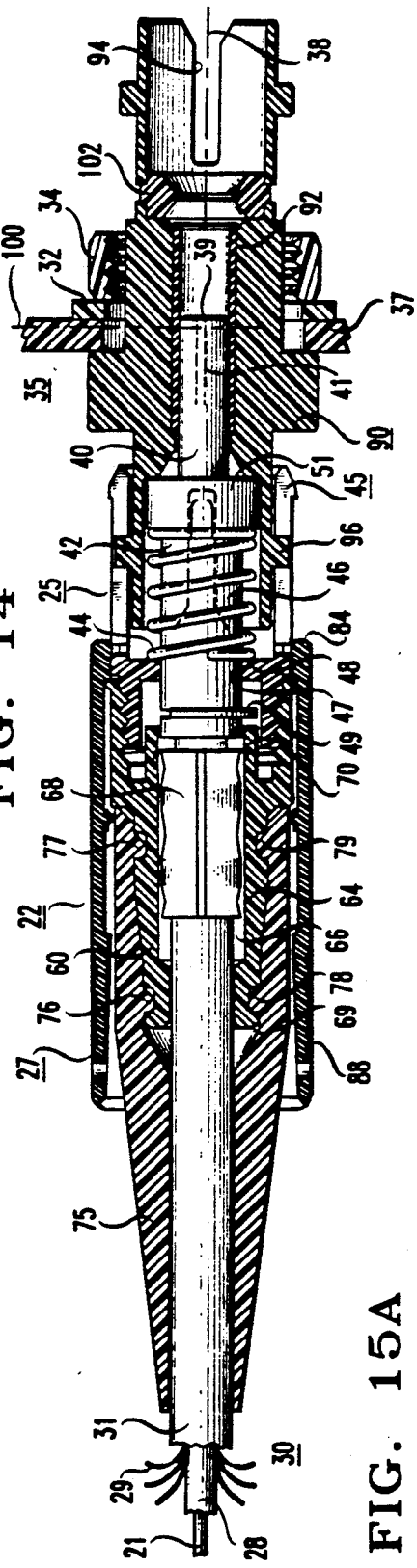
FIG. 14 is a side elevational view in section of the connector of FIG. 3 with the shell being in the unlocked position, and with a ferrule thereof being disposed in a coupling housing.
Figure 15A:
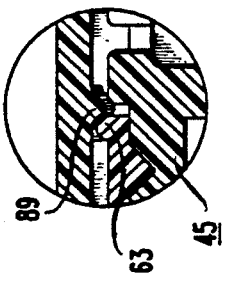
FIG. 15A is a detail view of a detent of the cap extender in engagement with a latch of the shell.
Figure 15:
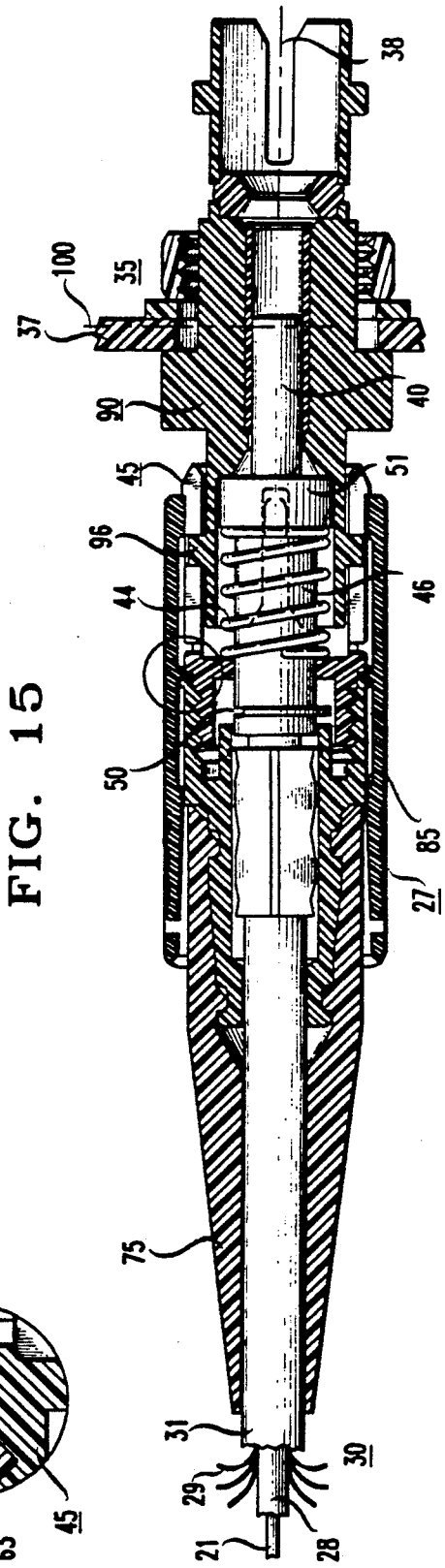
FIG. 15 is a front elevational view of the connector of FIG. 14 with the shell moved to a locked position.

Then the user moves the shell 27 slidably from its unlocked position as shown in FIG. 14 to its locked position shown in FIG. 15. The shell 27 is moved slidably toward the ferrule end of the connector assembly to cause the collar 84 to become engaged with the flanged end 55 of the cap. At that time, the detent 63 which is compressed as it is caused to move along the sidewall portion of the shell snap-locks into engagement with the latch 89 (see FIG. 15A) of the shell 27 to lock the cap 45 in position with the coupling housing pins 96—96 disposed in the portions 57—57 of the grooves 53—53 of the cap. Pushing the shell forward on the cap provides a mechanical lock and prevents unintentional mechanical decoupling of the connector plug assembly from the coupling housing 90 should the cable inadvertently be subjected to tensile forces.

It also should be observed from FIG. 11 that the shell has a cross sectional configuration transverse to a longitudinal axis which in a preferred embodiment is square. Of course, the inner portion of the shell in which is received the cap has a substantially circular cross section.

As mentioned, the arrangement of this invention locks the shell 27 to the cap 45 and thereby prevents mechanical decoupling of the connector 22 from the coupling housing 90 when tensile or rotational forces are applied to a cable 30. Not only is mechanical decoupling prevented, but also the connector is such that optical disconnection from another connector in the sleeve 92 is prevented.

Optical disconnection is prevented by the shoulder 70 of the cap extender 60 and its position relative to the retaining washer 49. As is seen, in FIG. 3, when the cap extender 60 is turned into the cap 45 and the ferrule 40 is disposed within the sleeve 92, a leading portion of the barrel is spaced from the housing 90. This occurs because with the ferrules 40—40 in engagement with each other at the optical plane in the sleeve 92, the ferrule 40, the ferrule on the left as viewed in FIG. 2, is not biased outwardly by the spring 44 as far as it would be if the associated ferrule was not engaging another ferrule (compare with FIG. 14). With the ferrule 40 in such a position, not only does the barrel 42 not engage the housing 90, also the retaining washer 49 is spaced from the annular lip 48 of the cap 45. Further, the retaining washer is spaced a distance $X_2$ from the shoulder 70. What is important is that the distance $X_2$ by which the ferrule 40 attached to the cable under tension, is less than the distance $X_1$ which the ferrule 40' can travel under the influence of its associated spring 44 can travel past the optical plane 100 to follow the ferrule 40 should the cable 30 be subjected to a tensile force substantially greater than two pounds. Therefore, when tensile forces are applied to the cable 30, the associated ferrule 40 is caused to move to the left as viewed in FIG. 2. As this occurs, the ferrule 40' follows the ferrule 40, remaining in engagement therewith. Then the retaining washer 49 of the ferrule 40 engages the shoulder 70 and because the distance $X_1$ which the ferrule 40' may move is greater than $X_2$, the ferrule 40' is still in engagement with the ferrule 40, thereby preventing optical disconnection. Further movement of the ferrule 40 is prevented because of the engagement by the retaining washer 49 with the shoulder 70. Of course, the foregoing arrangement is effective when tensile forces are applied to only one cable 30 of a connective arrangement such as when a coupling is mounted in a panel 37 and forces are applied to a cable on one side of the panel. Optical disconnection may occur if tensile forces are applied simultaneously to both sides of the connection arrangement.

In order to remove a connector 22 from a coupling 35, a user depresses the flexible portions 86—86 of the shell adjacent to their knurled ends 88—88. This causes the portions 86—86 to flex about their associated fulcrums 85—85 to disengage latches 89—89 from the detent 63 of the cap extender. This allows a pulling force which is applied to the cap to cause removal of the connector 22 from the coupling 35.

Figure 16:
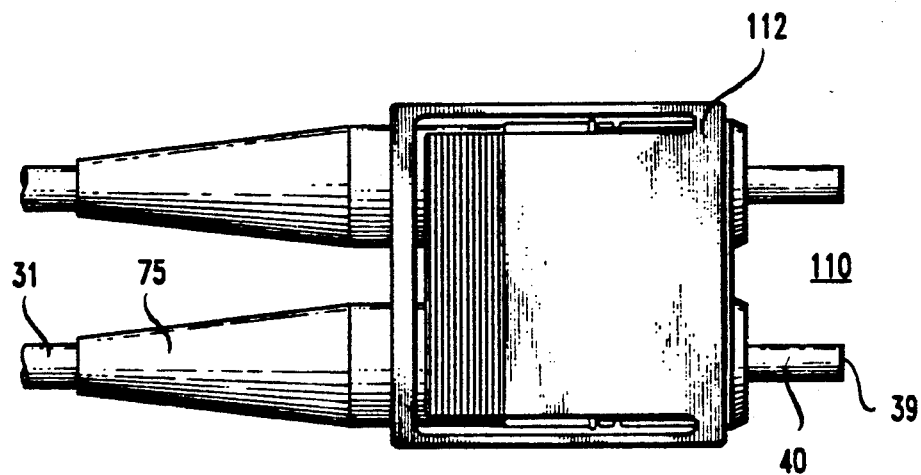
FIG. 16 is a plan view of a duplex connector.

As is seen in FIG. 16, the optical fiber connector 20 of this invention may be embodied in a duplex connector 110. The duplex connector 110 includes a shell 112 which is rectangular in cross section and which includes two cylindrical cavities each adapted to receive a connector plug subassembly 25. No special coupling or receptacle is required. Two connector subassemblies 25—25 are mounted side-by-side and assembled to two couplings 35—35 spaced apart a suitable distance. Of course, it should be apparent that connectors which include more than two of the foregoing described connector subassemblies also may be provided.

It also should be understood that the connector 20 of this invention may be connected through the coupling 35 to a prior art connector which may not include the anti-decoupling features of this invention.

It is to be understood that the above-described arrangements are simply illustrative of the invention. Other arrangements may be devised by those skilled in the art which will embody the principles of the invention and fall within the spirit and scope thereof.

We claim:

1. An optical fiber connector for terminating a jacketed optical fiber and adapted to be connected to another optical path, said connector comprising:

a cap which includes a longitudinally extending slot having an enlarged portion spaced inwardly from an entrance thereto, a cap extender having an optical fiber entry end and an opposite end which is connected to a fiber entry end of said cap;

a barrel which is mounted in said cap and biased outwardly therefrom in a direction from the fiber entry end to an opposite end of said cap;

a ferrule which is mounted in said barrel and which includes a passageway for receiving an end portion of an optical fiber, said ferrule adapted to become disposed in a sleeve of a coupling housing to abut means which terminates another light path at an optical connection plane within the sleeve;

said cap being capable of being assembled to the coupling housing by causing relative linear motion between said ferrule and said sleeve to cause said ferrule to become disposed in said sleeve and to cause a locking pin of the housing to enter said slot in said cap and become disposed in said enlarged portion thereof to secure said cap to the housing;

the cap extender including means which limits movement of the barrel and ferrule toward the fiber entry end of said cap extender while cooperating with the bias of said barrel to cause continued engagement of means in a sleeve of a coupling which terminates another light path with said ferrule until the movement of said ferrule toward said fiber entry end of said cap extender under tensile forces applied to the jacketed optical fiber has been discontinued to maintain optical coupling with the means in the sleeve which terminates the other light path; and means which cooperates with said cap for preventing withdrawal of said locking pin from said cap and unintended mechanical decoupling of said cap from the coupling housing.

2. An optical fiber connector for terminating an optical fiber cable and adapted to be connected to another connector which terminates an optical fiber of another optical fiber cable, said connector comprising:

a cap having one end to which opens a longitudinally extending slot having an enlarged portion spaced inwardly from an entrance thereto and having an opposite, fiber entry end;

a cap extender having an optical fiber entry end and an opposite end which is connected to the fiber entry end of said cap;

a barrel which is mounted in said cap and biased outwardly therefrom in a direction from the opposite end to the entrance of said slot of said cap;

a ferrule which is mounted in said barrel and which includes a passageway for receiving an end portion of an optical fiber, said ferrule adapted to become disposed in a sleeve of a coupling housing to abut another ferrule at an optical connection plane within said sleeve, the biasing of said ferrule being such that when the other ferrule is disengaged therefrom within the sleeve, said ferrule is capable of being moved past said optical connection plane a first distance;

said cap being capable of being assembled to the coupling housing by causing relative linear motion between said ferrule and the housing to cause said ferrule to become disposed in the sleeve and to cause a locking pin of the housing to enter said slot in said cap and become disposed in said enlarged portion thereof to secure said cap to the housing;

the cap extender including means which is effective when said cap is secured to a housing for limiting movement of said barrel and said ferrule in a direction from the opposite end to the fiber entry end of said cap extender a second distance which is less than said first distance; and means which cooperates with said cap for preventing withdrawal of said locking pin from said cap and unintended mechanical decoupling of said cap from the coupling housing.

3. The optical fiber connector of claim 2, wherein two said ferrules are adapted to be mounted in a coupling housing mounted in a panel and wherein when tensile forces are applied to an optical fiber cable having a fiber terminated by said ferrule to cause retrograde movement of said ferrule, said retrograde movement is limited to a distance which is less than the first distance by which the other ferrule can move to maintain contact and optical connection with said ferrule.

4. An optical fiber connector which terminates an optical fiber of an optical fiber cable and which is adapted to be connected to another connector which terminates an optical fiber of another optical fiber cable, said connector comprising:

a cap which includes a flanged end and two diametrically opposed slots each extending longitudinally from said flanged end toward an opposite, fiber entry end of said cap, each said slot having an enlarged portion which is disposed between said flanged end and an inner end of said each slot and which is adapted to receive a locking pin of a coupling to which said connector is to be secured, said cap including an annularly disposed lip disposed adjacent said opposite end and projecting inwardly;

a barrel which extends through an opening defined by said annularly projecting lip of said cap and which includes an enlarged end adjacent to said flanged end of said cap, said barrel including a cavity opening to the enlarged end thereof and an outwardly projecting key which is adapted to be received in a keyway of the coupling;

a ferrule which has a passageway therethrough for receiving an end portion of an optical fiber and having an end portion which is disposed in said cavity of said barrel, said ferrule adapted to become disposed in a sleeve of the coupling to abut another ferrule which terminates another optical fiber at an optical connection plane within the sleeve;

a compression spring which is disposed about said barrel between one side of said annular lip of said cap and said enlarged portion of said barrel and which is effective to bias said barrel and said ferrule in a direction outwardly from said cap, the biasing of the ferrule being such that when the other ferrule is disengaged therefrom within the sleeve, said ferrule is capable of being moved past said optical plane a first distance;

retention means disposed about said barrel in a predetermined position on an opposite side of said annular lip to hold said barrel within said cap as forces of said compression spring tend to urge said barrel outwardly and axially from said cap;

a cap extender having an optical fiber entry end and an opposite end which is connected to said fiber entry end of said cap for transferring forces applied to the cable to said cap, said cap extender including abutment means effective when said cap is secured to a housing for limiting movement of said barrel and said ferrule in a direction from the opposite end of said cap extender to said fiber entry end thereof to a second distance, which is less than said first distance, said cap extender including detent means adjacent to said opposite end of said cap; and a shell disposed concentrically about and movable slidably with respect to said cap extender, said shell having an annularly inwardly projecting collar disposed adjacent one end thereof and annular latching means formed between said collar and an opposite end thereof, said shell being movable from an unlocked position whereat said collar is disposed adjacent to said detent means to a locked position whereat said detent means is caused to snap-lock with said latching means and said collar becomes disposed adjacent to said flanged end of said cap to hold said connector such that said ferrule is disposed within the coupling housing and locking pins of the coupling housing in which said ferrule is disposed are retained within said enlarged portions of said slots in said cap.

5. The connector of claim 4, wherein when said ferrule is disposed in the sleeve of a coupling housing in engagement with another ferrule, said barrel is spaced slightly from the coupling housing and said cap extender includes a shoulder which is disposed concentrically within said opposite end of said cap extender and which is adapted to engage said retention means when tensile forces are applied to said cap extender.

6. The connector of claim 5, wherein said barrel includes a portion which extends into said cap extender and is adapted to have a tubular member crimped thereto.

7. The connector of claim 5, wherein said shell includes means including means capable of being moved toward a longitudinal axis of the connector to disconnect said latching means of said shell from said detent means of said cap extender to allow mechanical disconnection of said connector from the coupling.

8. The connector of claim 7, wherein said abutment means is such that said retention means on said barrel engages said abutment means after forces which are applied to the cable cause said barrel and said ferrule to move the second distance.

9. The connector of claim 8, wherein the second distance is such that optical connection is maintained during such movement.

10. The connector of claim 4, wherein said shell has a rectangular configuration transverse to a longitudinal centerline axis of said connector.

11. The connector of claim 4, wherein an outer portion of a peripheral wall of said cap is enlarged in thickness to provide a guide rail which is adapted to be received in a groove of said shell.

12. A multi-fiber connector which includes:
  a plurality of optical fiber connector subassemblies each of which includes:
    a cap which includes a longitudinally extending slot having an enlarged portion spaced inwardly from an entrance thereto,
    a cap extender which is connected to a fiber entry end of said cap;
    a barrel which is mounted in said cap and biased outwardly therefrom; and
    a ferrule which is mounted in said barrel and which includes a passageway for receiving an end portion of an optical fiber, said ferrule adapted to become disposed in a sleeve of a coupling housing to abut another ferrule at an optical connection plane within said sleeve, the biasing of said barrel and ferrule mounted therein being such that when the other ferrule is disengaged therefrom, said ferrule is capable of being moved past said optical connection plane a first distance;
    said cap being capable of being secured to the coupling housing by causing relative linear motion between said ferrule and the sleeve to cause said ferrule to become disposed in the sleeve and to cause a locking pin of the housing to enter said slot of said cap and become disposed in said enlarged portion thereof;
    the cap extender including means for limiting movement of said ferrule from said optical plane a second distance which is less than said first distance; and
  a shell which is disposed about said plurality of optical fiber subassemblies and which includes means which cooperates with a cap of each said subassembly to prevent withdrawal of a locking pin from said cap of said each subassembly and unintentional mechanical decoupling of said cap from the housing.

13. An optical fiber connection, which includes:
  two optical fiber cables each including an optical fiber and a protective jacket;
  a coupling which includes:
    a housing which includes adjacent each end thereof two diametrically opposed, radially extending pins and a longitudinally extending keyway; and
    a sleeve which is disposed within said housing; and
  two optical fiber connectors, which are secured to said coupling and at least one of which includes:
    a cap which includes a flanged end and two diametrically opposed slots each extending longitudinally from said flanged end toward an opposite end of said cap, each said slot having an enlarged portion which is disposed between said flanged end and an inner end of said each slot and in which is received a locking pin of said coupling to which said connector is secured, said cap including an annularly disposed lip disposed adjacent said opposite end and projecting inwardly;
    a barrel which extends through an opening defined by said annularly projecting lip of said cap and which includes an enlarged end adjacent to said flanged end of said cap, said barrel including a cavity opening to the enlarged end thereof and an outwardly projecting key which is received in said keyway of said housing;
    a ferrule which has a passageway therethrough for receiving an end portion of an optical fiber and having an end portion which is disposed in said cavity of said barrel, said ferrule disposed in said sleeve of said coupling to abut another ferrule which terminates another optical fiber at an optical connection plane within the sleeve;
    a compression spring which is disposed about said barrel between one side of said annular lip of said cap and said enlarged portion of said barrel and which is effective to bias said barrel and said ferrule in a direction outwardly from said cap, the biasing of the ferrule being such that when the other ferrule is disengaged therefrom within the sleeve, said ferrule is capable of being moved past said optical plane a first distance;
    retention means disposed about said barrel in a predetermined position on an opposite side of said annular lip to hold said barrel within said cap as forces of said compression spring tend to urge said barrel outwardly and axially from said cap;
    a cap extender having an optical fiber entry end and an opposite end which is connected to said opposite end of said cap for transferring forces applied to the cable to said cap, said cap extender including abutment means effective when said cap is secured to said housing for limiting movement of said barrel and said ferrule in a direction from the opposite end of said cap extender to said fiber entry end thereof to a second distance which is less than said first distance, said cap extender means including detent means adjacent to said opposite end of said cap; and
    a shell disposed concentrically about and movable slidably with respect to said cap extender, said shell having an annularly inwardly projecting collar disposed adjacent one end thereof and annular latching means formed between said collar and an opposite end thereof, said shell being movable from an unlocked position whereat said collar is disposed adjacent to said detent means to a locked position whereat said detent means is caused to snap-lock with said latching means and said collar becomes disposed adjacent to said flanged end of said cap to hold said connector such that said ferrule is disposed within the coupling housing and each locking pin of the coupling housing in which said ferrule is disposed is retained within said enlarged portion of one of said slots in said cap.

14. The optical fiber connection of claim 13, wherein said barrel of each connector is spaced a distance from the housing which is less than said first distance.

15. The optical fiber connection of claim 13, wherein said barrel about which is disposed said retention means includes a peripheral groove and said retention means comprises a washer.

16. The optical fiber connection of claim 15, wherein said cap extender includes annular abutment means which is disposed concentrically within and spaced from said end of said cap extender means which is connected to said opposite end of said cap.

17. The optical fiber connection of claim 16, wherein said annular abutment means is such that said retention means on said barrel engages said annular abutment means after forces which are applied to the cable cause said barrel and said ferrule to move the second distance.

18. The optical fiber connection of claim 17, wherein said second distance is such that optical connection is maintained during such movement.

19. The optical fiber connection of claim 18, wherein said shell has a rectangular configuration transverse to a longitudinal centerline axis of said connection.

20. The optical fiber connection of claim 19, wherein an outer portion of a peripheral wall of said cap is enlarged in thickness to provide a guide rail which is adapted to be received in a groove of said shell.

* * * * *